US009240146B2

(12) United States Patent  
Ohyama et al.

(10) Patent No.: US 9,240,146 B2  
(45) Date of Patent: Jan. 19, 2016

(54) LIQUID CRYSTAL DISPLAY DEVICE AND DRIVING METHOD THEREFORE AS WELL AS ELECTRONIC APPARATUS

(71) Applicant: Japan Display Inc., Tokyo (JP)

(72) Inventors: Tsuyoshi Ohyama, Tokyo (JP); Yingbao Yang, Kanagawa (JP)

(73) Assignee: Japan Display Inc., Tokyo (JP)

(*) Notice: Subject to any disclaimer, the term of this patent is extended or adjusted under 35 U.S.C. 154(b) by 534 days.

(21) Appl. No.: 13/687,494

(22) Filed: Nov. 28, 2012

(65) Prior Publication Data

US 2013/0148045 A1 Jun. 13, 2013

(30) Foreign Application Priority Data

Dec. 13, 2011 (JP) ................................. 2011-271942

(51) Int. Cl.  
G02F 1/1335 (2006.01)  
G02F 1/1347 (2006.01)  
G09G 3/36 (2006.01)  
G09G 3/00 (2006.01)  
H04N 13/04 (2006.01)

(52) U.S. Cl.  
CPC .................. *G09G 3/36* (2013.01); *G09G 3/003* (2013.01); *H04N 13/0409* (2013.01); *H04N 13/0422* (2013.01); *H04N 13/0468* (2013.01); *H04N 13/0497* (2013.01)

(58) Field of Classification Search  
CPC .......... H04N 13/0409; H04N 13/0422; H04N 13/0468; H04N 13/0497; G02B 27/2214; G02B 27/22; G02B 27/2228; G02B 27/225; G09G 3/36; G09G 3/003

USPC ........... 349/15, 74; 345/51, 98–100, 208–213  
See application file for complete search history.

(56) References Cited

U.S. PATENT DOCUMENTS

2008/0013001 A1* 1/2008 Jang et al. ........................ 349/15  
2011/0043715 A1* 2/2011 Ohyama et al. ................. 349/15

FOREIGN PATENT DOCUMENTS

| CN | 101995667 A | 3/2011 |
| JP | 09-197344 | 7/1997 |
| JP | 2001-285896 A | 10/2001 |

(Continued)

OTHER PUBLICATIONS

Japanese Office Action issued May 20, 2014 for corresponding Japanese Application No. 2011-271942.

(Continued)

*Primary Examiner* — Edward Glick  
*Assistant Examiner* — David Chung  
(74) *Attorney, Agent, or Firm* — Michael Best & Friedrich LLP

(57) ABSTRACT

A liquid crystal display device includes a liquid crystal panel, a light blocking barrier, and a sensor. The apparatus has a barrier driving controlling unit, a display controlling unit, and a display mode decision unit to decide a display mode of an image to be displayed on the panel. The barrier driving controlling unit controls, when it is decided that the display mode is a first mode, driving of the barrier so that the position of the light blocking section of the barrier is moved in response to the position of the viewer detected by the sensor. The display controlling unit controls, when it is decided that the display mode is a second mode, the display of the panel so that the display position of the left-eye and the right-eye images on the panel is moved in response to the position of the viewer detected by the sensor.

4 Claims, 16 Drawing Sheets

(56) References Cited

FOREIGN PATENT DOCUMENTS

| | | |
|---|---|---|
| JP | 2011-043623 A | 3/2011 |
| JP | 2011-197509 A | 10/2011 |

OTHER PUBLICATIONS

Chinese Office Action issued Oct. 10, 2015 for corresponding Chinese Application No. 201210518636.6.

* cited by examiner

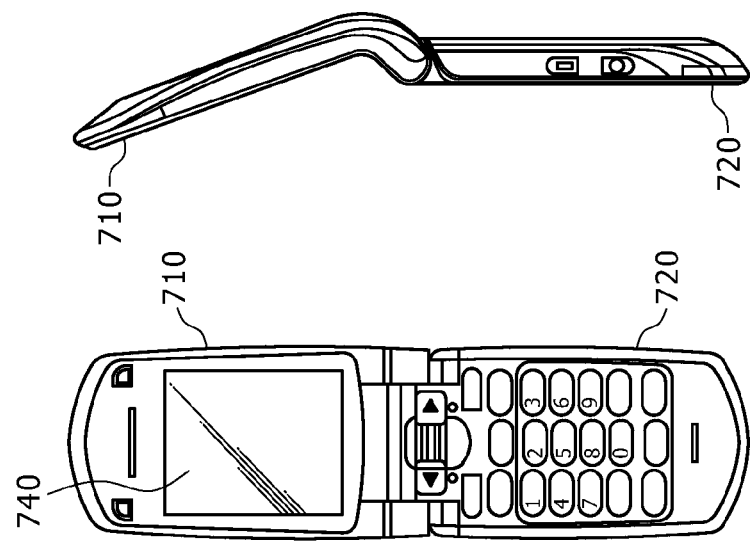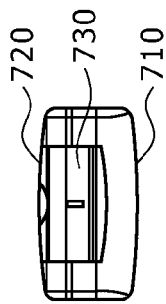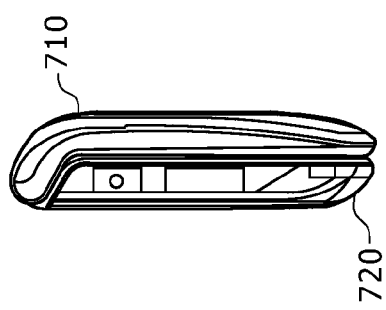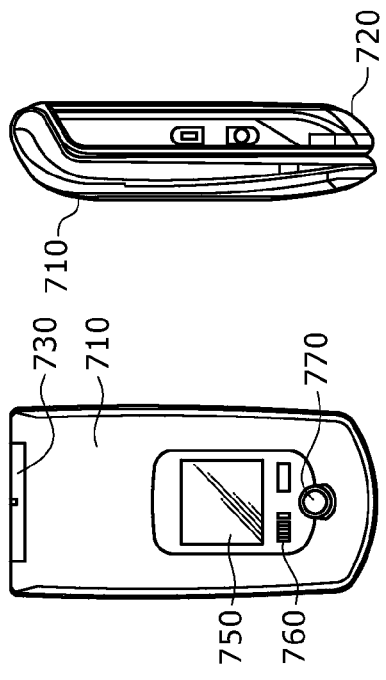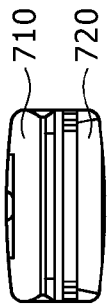

LIQUID CRYSTAL DISPLAY DEVICE AND DRIVING METHOD THEREFORE AS WELL AS ELECTRONIC APPARATUS

BACKGROUND

The present technology relates to a liquid crystal display device and a driving method therefor as well as an electronic apparatus. More particularly, the present technology relates to a liquid crystal display device and a driving method therefor as well as an electronic apparatus by which optimization of display of a stereoscopic image can be achieved.

A liquid crystal display device is known which uses a parallax barrier system or a lenticular lens system to display a stereoscopic image without the necessity for special eyeglasses.

In one of such display apparatus wherein a binocular parallax is utilized to display a stereoscopic image without the necessity for special eyeglasses, the position of the head of a viewer is detected. Then, the position of a light blocking region of a light blocking barrier is moved based on the detected position of the head in order to eliminate an uncomfortable feeling when an image for the left eye and an image for the right eye are switched. A display apparatus of the type described is disclosed, for example, in Japanese Patent Laid-Open No. Hei 9-197344.

SUMMARY

Incidentally, in recent years, some liquid crystal display device provided in such an electronic apparatus as a portable telephone set or a tablet PC carries out both of landscape display wherein the display area is disposed in a horizontally elongated state and portrait display wherein the display area is disposed in a vertically elongated state.

However, such a liquid crystal display device as described above does not have a feature for optimizing display of a stereoscopic image in response to the position of a viewer in both of the landscape display mode and the portrait display mode.

Therefore, it is desirable to optimize display of a stereoscopic image in response to the position of a viewer irrespective of the display mode.

According to an embodiment of the present technology, there is provided a liquid crystal display device including a liquid crystal panel which displays a left-eye image and a right-eye image, a light blocking barrier having a light blocking section which creates a binocular parallax, and a sensor which detects a position of a viewer, including a barrier driving controlling unit configured to control driving of the light blocking barrier, a display controlling unit adapted to control display of the liquid crystal panel, and a display mode decision unit configured to decide a display mode of an image to be displayed on the liquid crystal panel. The barrier driving controlling unit controls, when the display mode decision unit decides that the display mode of the image is a first mode, driving of the light blocking barrier so that the position of the light blocking section of the light blocking barrier is moved in response to the position of the viewer detected by the sensor. The display controlling unit controls, when the display mode decision unit decides that the display mode of the image is a second mode, the display of the liquid crystal panel so that the display position of the left-eye image and the right-eye image on the liquid crystal panel is moved in response to the position of the viewer detected by the sensor.

The liquid crystal display device may be configured such that the barrier driving controlling unit controls, when the display mode decision unit decides that the display mode of the image is the first mode, the light blocking barrier to form the light blocking section in a striped pattern, and, when the display mode decision unit decides that the display mode of the image is the second mode, the light blocking barrier to form the light blocking section in a stepped pattern.

The first mode may be a mode in which a parallax direction and a line of a color filter in the liquid crystal panel extend in parallel to each other, and the second mode may be a different mode in which the parallax direction and the line of the color filter in the liquid crystal panel extend perpendicular to each other.

The liquid crystal display device may further include a backlight configured to introduce light for display of the image into the liquid crystal panel, and the light blocking barrier may be disposed between the liquid crystal panel and the backlight.

According to another embodiment of the present technology, there is provided a driving method for a liquid crystal display device including a liquid crystal panel which displays a left-eye image and a right-eye image, a light blocking barrier having a light blocking section which creates a binocular parallax, and a sensor which detects a position of a viewer. The liquid crystal display device further includes a barrier driving controlling unit configured to control driving of the light blocking barrier, a display controlling unit adapted to control display of the liquid crystal panel, and a display mode decision unit configured to decide a display mode of an image to be displayed on the liquid crystal panel. The driving method is executed by the liquid crystal display device, and the method includes deciding the display mode of the image to be displayed on the liquid crystal panel, and controlling, when it is decided that the display mode of the image is a first mode, driving of the light blocking barrier so that the position of the light blocking section of the light blocking barrier is moved in response to the position of the viewer detected by the sensor, and controlling, when it is decided that the display mode of the image is a second mode, the display of the liquid crystal panel so that the display position of the left-eye image and the right-eye image on the liquid crystal panel is moved in response to the position of the viewer detected by the sensor.

According to a further embodiment of the present technology, there is provided an electronic apparatus including a liquid crystal display device configured to carry out display based on an image signal, and a processing section configured to produce the image signal by a predetermined process. The liquid crystal display device includes a liquid crystal panel which displays a left-eye image and a right-eye image, a light blocking barrier having a light blocking section which creates a binocular parallax, and a sensor which detects a position of a viewer. The liquid crystal display device further includes a barrier driving controlling unit configured to control driving of the light blocking barrier, a display controlling unit adapted to control display of the liquid crystal panel, and a display mode decision unit configured to decide a display mode of an image to be displayed on the liquid crystal panel. The barrier driving controlling unit controls, when the display mode decision unit decides that the display mode of the image is a first mode, driving of the light blocking barrier so that the position of the light blocking section of the light blocking barrier is moved in response to the position of the viewer detected by the sensor. The display controlling unit also controls, when the display mode decision unit decides that the display mode of the image is a second mode, the display of the liquid crystal panel so that the display position of the left-eye image and the right-eye image on the liquid crystal panel is moved in response to the position of the viewer detected by the sensor.

In the liquid crystal display device, driving method for the liquid crystal display device and electronic apparatus according to an embodiment of the present technology, when it is decided that the display mode of an image is the first mode, driving of the light blocking barrier is controlled so that the position of the light blocking section of the light blocking barrier is moved in response to the position of the viewer detected by the sensor. However, when it is decided that the display mode of the image is the second mode, the display of the liquid crystal panel is controlled so that the display position of the left-eye image and the right-eye image on the liquid crystal panel is moved in response to the position of the viewer detected by the sensor.

With the liquid crystal display device, driving method for the liquid crystal display device and electronic apparatus according to an embodiment of the present technology, optimization of the display of a stereoscopic image can be anticipated irrespective of the display mode.

BRIEF DESCRIPTION OF THE DRAWINGS

FIGS. 13, 14A and 14B, 15, 16 and 17A to 17G are schematic views illustrating different application examples of the present technology to an electronic apparatus.

DETAILED DESCRIPTION OF THE PREFERRED EMBODIMENT

In the following, an embodiment of the present technology is described with reference to the accompanying drawings. It is to be noted that the description is given in the following order.

1. Example of the Configuration of the Liquid crystal display device
2. Stereoscopic Image Displaying Process of the Liquid crystal display device
3. Application Examples to an Electronic apparatus <1. Example of the Configuration of the Liquid crystal display device>

Figure 1:
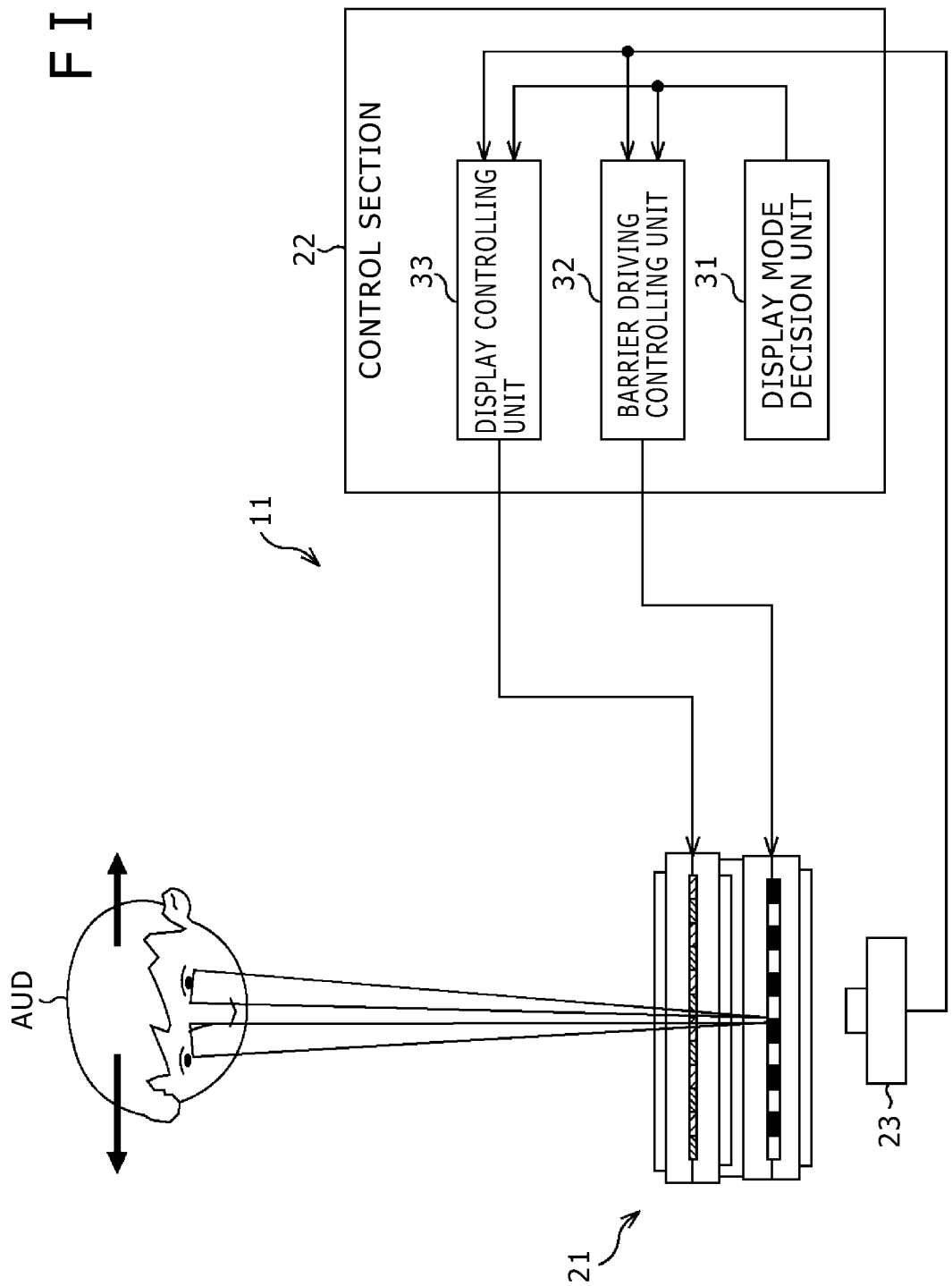
FIG. 1 is a block diagram showing an example of a configuration of a stereoscopic image display apparatus according to an embodiment of the present technology.

FIG. 1 shows an example of a configuration of a liquid crystal display device according to an embodiment of the present technology.

Referring to FIG. 1, the liquid crystal display device 11 is incorporated in a portable electronic apparatus such as, for example, a portable telephone set or a tablet PC. The liquid crystal display device 11 displays a stereoscopic image or a planar image while carrying out changeover of the display image between a three-dimensional or stereoscopic image according to the parallax barrier system and a two-dimensional planar image as occasion demands. The liquid crystal display device 11 has a rectangular pixel region in which an image is to be displayed. Particularly, the liquid crystal display device 11 is configured to allow a viewer AUD to view an image displayed in the pixel region in any of the landscape or horizontally elongated mode in which the pixel region extends long in an x direction and the portrait or vertically elongated mode in which the pixel region extends long in a y direction. The liquid crystal display device 11 is further configured such that, when it displays a stereoscopic image, it displays the stereoscopic image in response to the position of the head of the viewer AUD.

The liquid crystal display device 11 includes a display section 21, a control section 22 and a camera 23.

The display section 21 includes a backlight, a light modulating panel, and a parallax barrier. The display section 21 displays a three-dimensional stereoscopic image formed from a right-eye image viewed or perceived by the right eye of the viewer AUD and a left-eye image viewed by the left eye of the viewer AUD or a two-dimensional planar image. In the display section 21, the parallax barrier is disposed between the light modulating panel and the backlight. It is to be noted that details of the display section 21 are hereinafter described with reference to FIG. 2.

The control section 22 controls operation of the components of the display section 21, namely, operation of the backlight, light modulating panel and parallax barrier. More particularly, the control section 22 drives a display driver not shown of the display section 21 to display an image on the light modulating panel or controls the backlight to emit light. Further, the control section 22 controls driving of the parallax barrier of the display section 21 to cause the light modulating panel to display a stereoscopic image.

The camera 23 picks up an image of the viewer AUD at a predetermined timing and supplies the resulting image, namely, a camera image, to the control section 22. The control section 22 specifies the position of the head of the viewer AUD based on the camera image from the camera 23. In other words, the camera 23 functions as a sensor for detecting the position of the head of the viewer AUD. Accordingly, only it is necessary for the camera 23 to have a configuration for detecting the position of the head of the viewer AUD even if it has a function of picking up an image of the viewer AUD.

Now, a detailed configuration of the control section 22 is described.

The control section 22 includes a display mode decision unit 31, a barrier driving controlling unit 32 and a display controlling unit 33.

The display mode decision unit 31 decides the display mode of an image in the rectangular pixel region of the display section 21 in which an image is displayed, or in other words, the display mode of an image in the display region of the display section 21. More particularly, the display mode decision unit 31 decides whether the display mode is the landscape or horizontally elongated display mode or the portrait or vertically elongated display mode. The display mode decision unit 31 supplies a result of the decision to the barrier driving controlling unit 32 and the display controlling unit 33.

When the liquid crystal display device 11 displays a stereoscopic image, the barrier driving controlling unit 32 controls driving of the parallax barrier of the display section 21 to partly block incoming light to the parallax barrier from the backlight to create a binocular parallax. In particular, the barrier driving controlling unit 32 controls the parallax barrier to form a slit region in which light is transmitted and a light blocking region in which light is blocked thereby to separate a right-eye image and a left-eye image from each other. More particularly, the barrier driving controlling unit 32 controls the parallax barrier to operate in response to a result of decision of the display mode from the display mode decision unit 31 so that a slit region and a light blocking region are formed on the parallax barrier in response to the position of the head of the viewer AUD detected by the camera 23.

The display controlling unit 33 controls display of an image on the display section 21. Particularly, the display controlling unit 33 controls display of an image on the display section 21 in response to a result of decision of the display mode from the display mode decision unit 31 and the position of the head of the viewer AUD detected by the camera 23.

[Example of the Configuration of the Display Section]

Now, an example of a detailed configuration of the display section 21 shown in FIG. 1 is described with reference to FIG. 2. It is to be noted that, in FIG. 2, the horizontal direction, depthwise direction and vertical direction are denoted by x direction, y direction and z direction, respectively.

The display section 21 includes a backlight 41, a parallax barrier 42 and a light modulating panel 43. As described hereinabove, in the display section 21, the parallax barrier 42 is disposed between the backlight 41 and the light modulating panel 43.

The backlight 41 is an illumination apparatus for exclusive use for an image display apparatus configured from a light guide plate, a light source such as LEDs (Light Emitting Diodes), a reflecting sheet and so forth. The backlight 41 emits light for displaying an image such that the light enters the light modulating panel 43 through the parallax barrier 42.

The parallax barrier 42 is configured from a polarizing plate, a switching liquid crystal layer, and so forth. Upon display of a stereoscopic image, the parallax barrier 42 blocks part of light incoming from the backlight 41 and transmits the remaining part of the light so as to enter the light modulating panel 43 thereby to optically separate a right-eye image and a left-eye image from each other. On the other hand, upon display of a planar image, the parallax barrier 42 transmits incoming light from the backlight 41 as it is therethrough so as to enter the light modulating panel 43.

The parallax barrier 42 is configured from a polarizing plate 51, another polarizing plate 61, a transparent substrate 62, another transparent substrate 63, a switching liquid crystal layer 64, and a transparent resin layer 65. In FIG. 2, the polarizing plate 61 is used both as a member for configuring the parallax barrier 42 and a member for configuring the light modulating panel 43. It is to be noted here that, while the polarizing plate 61 is disposed on the light modulating panel 43 side in the transparent resin layer 65 formed between the parallax barrier 42 and the light modulating panel 43, it may otherwise be provided on the parallax barrier 42 side, namely, on the transparent substrate 62 side.

In the parallax barrier 42, the transparent substrates 62 and 63 both in the form of a flat plate are provided in a mutually opposing relationship to each other between the polarizing plates 51 and 61 which are disposed in an opposing relationship to each other. The switching liquid crystal layer 64 is formed between the transparent substrates 62 and 63.

Electrodes are formed on a face of the transparent substrates 62 and 63 on the switching liquid crystal layer 64 side. If a voltage is applied to some or all of the electrodes under the control of the barrier driving controlling unit 32, then the orientation direction of liquid crystal molecules in the switching liquid crystal layer 64 changes. In particular, the barrier driving controlling unit 32 controls driving of the switching liquid crystal layer 64 to create a parallax barrier. The switching liquid crystal layer 64 is formed, for example, from twisted nematic liquid crystal and blocks light in a region thereof to which a voltage is applied but transmits light therethrough in a region thereof to which the voltage is not applied. Accordingly, a parallax barrier is formed by applying a voltage to a light blocking region of the switching liquid crystal layer 64 in which light is to be blocked.

Figure 2:
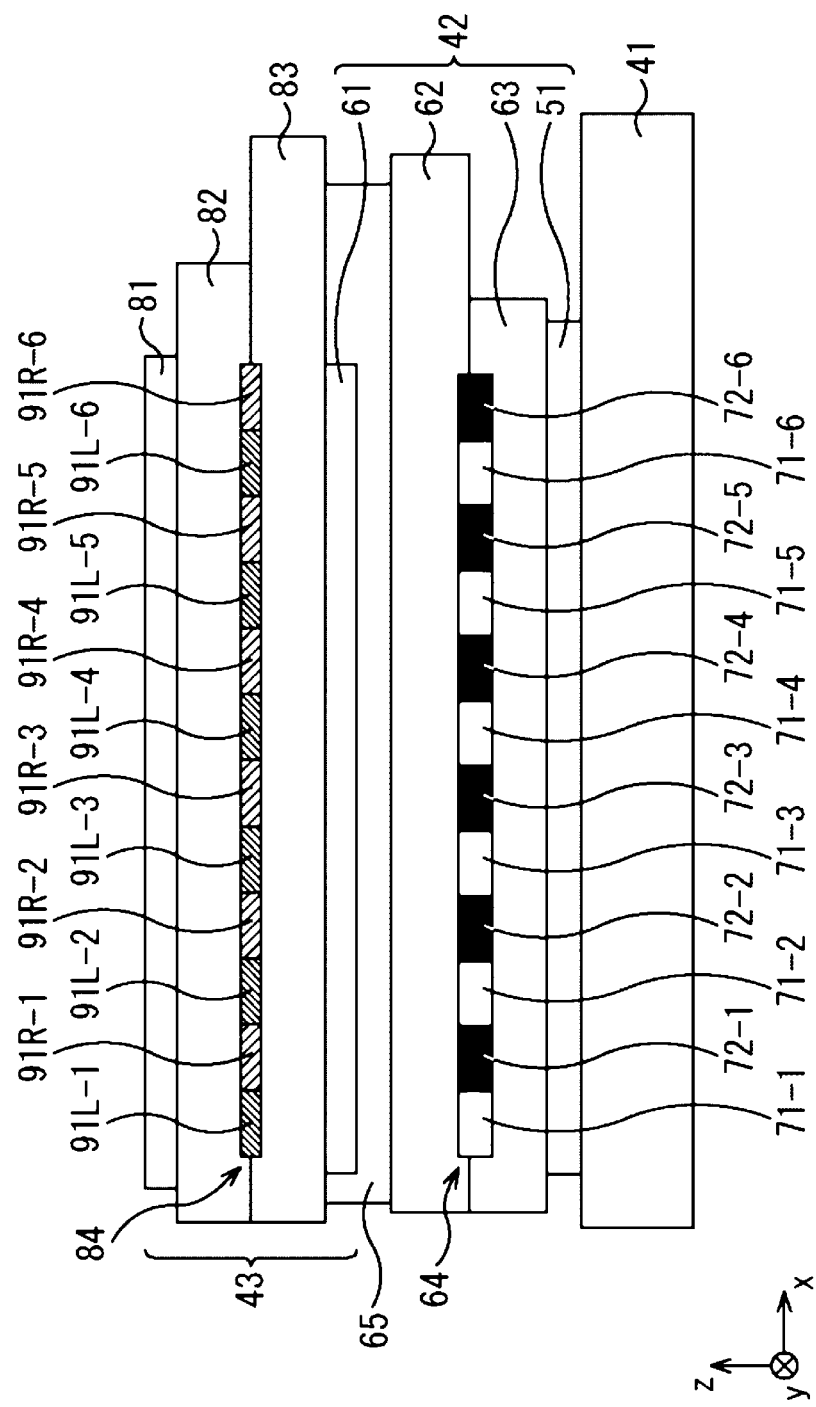
FIG. 2 is a schematic sectional view showing an example of a configuration of a display section of the stereoscopic image display apparatus.

In the arrangement of FIG. 2, a parallax barrier is formed in the switching liquid crystal layer 64. The parallax barrier includes slit regions 71-1 to 71-6 in which light incoming from the backlight 41 is transmitted and light blocking regions 72-1 to 72-6 in which the incoming light from the backlight 41 is blocked.

It is to be noted that, in the following description, where there is no necessity to individually distinguish the slit regions 71-1 to 71-6 from each other, each of them is referred to simply as slit region 71. Further, where there is no necessity to individually distinguish the light blocking regions 72-1 to 72-6 from each other, each of them is referred to simply as light blocking region 72.

When the display section 21 is to display a stereoscopic image, a voltage is applied to the electrodes of the transparent substrates 62 and 63 to form a parallax barrier in the switching liquid crystal layer 64. In this instance, when light enters the slit regions 71 after it is emitted from the backlight 41 and converted into linearly polarized light by the polarizing plate 51, the polarization direction thereof is rotated by 90 degrees by the liquid crystal layer. The light therefore is transmitted through the polarizing plate 61. On the other hand, when light enters the light blocking regions 72 after it is emitted from the backlight 41 and converted into linearly polarized light by the polarizing plate 51, the polarization direction thereof is not rotated. Therefore, the light is absorbed by the polarizing plate 61 and is not emitted from the parallax barrier 42.

On the other hand, when a planar image is to be displayed on the display section 21, no voltage is applied to the electrodes of the transparent substrates 62 and 63, and no parallax barrier is formed in the switching liquid crystal layer 64. In other words, the overall area of the switching liquid crystal layer 64 exhibits a state same as that in the slit regions 71. In this instance, all of light incoming from the backlight 41 is transmitted through the parallax barrier 42 and enters the light modulating panel 43.

The light modulating panel 43 is a liquid crystal display panel configured from color filters for the colors of R, G and B, a liquid crystal layer, a polarizing plate, thin film transistors and so forth. The light modulating panel 43 transmits light incoming thereto from the backlight 41 through the parallax barrier 42 to display an image. At this time, the light modulating panel 43 carries out gradation display of each pixel of an image by changing the light transmittance for each of the pixels provided on the light modulating panel 43.

The light modulating panel 43 is configured from a polarizing plate 61, another polarizing plate 81, an opposing substrate 82, a TFT (Thin Film Transistor) substrate 83 and a liquid crystal layer 84.

In particular, the opposing substrate 82 and the TFT substrate 83 each in the form of a flat plate are disposed in an opposing relationship to each other between the polarizing plate 61 and the polarizing plate 81 which are disposed in an opposing relationship to each other. The liquid crystal layer 84 is formed between the opposing substrate 82 and the TFT substrate 83.

A color filter and an opposing electrode are provided for each pixel on a face of the opposing substrate 82 on the liquid crystal layer 84 side. More particularly, color filters for the colors of R, G and B are provided in a region of each pixel of the opposing substrate 82. Meanwhile, on a face of the TFT substrate 83 on the liquid crystal layer 84 side, TFTs (thin film transistors) which are a pixel electrode and a driving element are provided for each pixel.

In the liquid crystal layer 84, transmission regions 91L-1 to 91L-6 which transmit light for displaying a left-eye image therethrough upon display of a stereoscopic image and transmission regions 91R-1 to 91R-6 which transmit light for displaying a right-eye image therethrough upon display of a stereoscopic image are provided. In the light modulating panel 43, one transmitting portion is provided in each of the pixels disposed in rows and columns.

Upon display of a stereoscopic image or a planar image, if a voltage is applied to the opposing electrodes of the opposing substrate 82 and the pixel electrodes of the TFT substrate 83 under the control of the display controlling unit 33, then the orientation direction of liquid crystal molecules enclosed in the transmission regions 91L-1 to 91L-6 and 91R-1 to 91R-6 changes in responses to the magnitude of the voltage. Consequently, the transmittance of light incoming to the light modulating panel 43 from the backlight 41 through the parallax barrier element 42 changes, and the amount of light transmitted through each pixel becomes a light amount corresponding to the pixel value of the pixel of the image to be displayed by the pixel.

It is to be noted that, in the following description, where there is no necessity to individually distinguish the transmission regions 91L-1 to 91L-6 from each other, each of them is referred to simply as transmission region 91L. Further, where there is no necessity to individually distinguish the transmission regions 91R-1 to 91R-6 from each other, each of them is referred to simply as transmission region 91R. Further, where there is no necessity to particularly distinguish the transmission region 91L and the transmission region 91R from each other, each of them is referred to simply as transmission region 91.

In the light modulating panel 43, the transmission regions 91L and the transmission regions 91R are provided alternately in the x direction on the xy plane while, in the y direction, the transmission regions 91L or the transmission regions 91R are juxtaposed successively.

Figure 3:
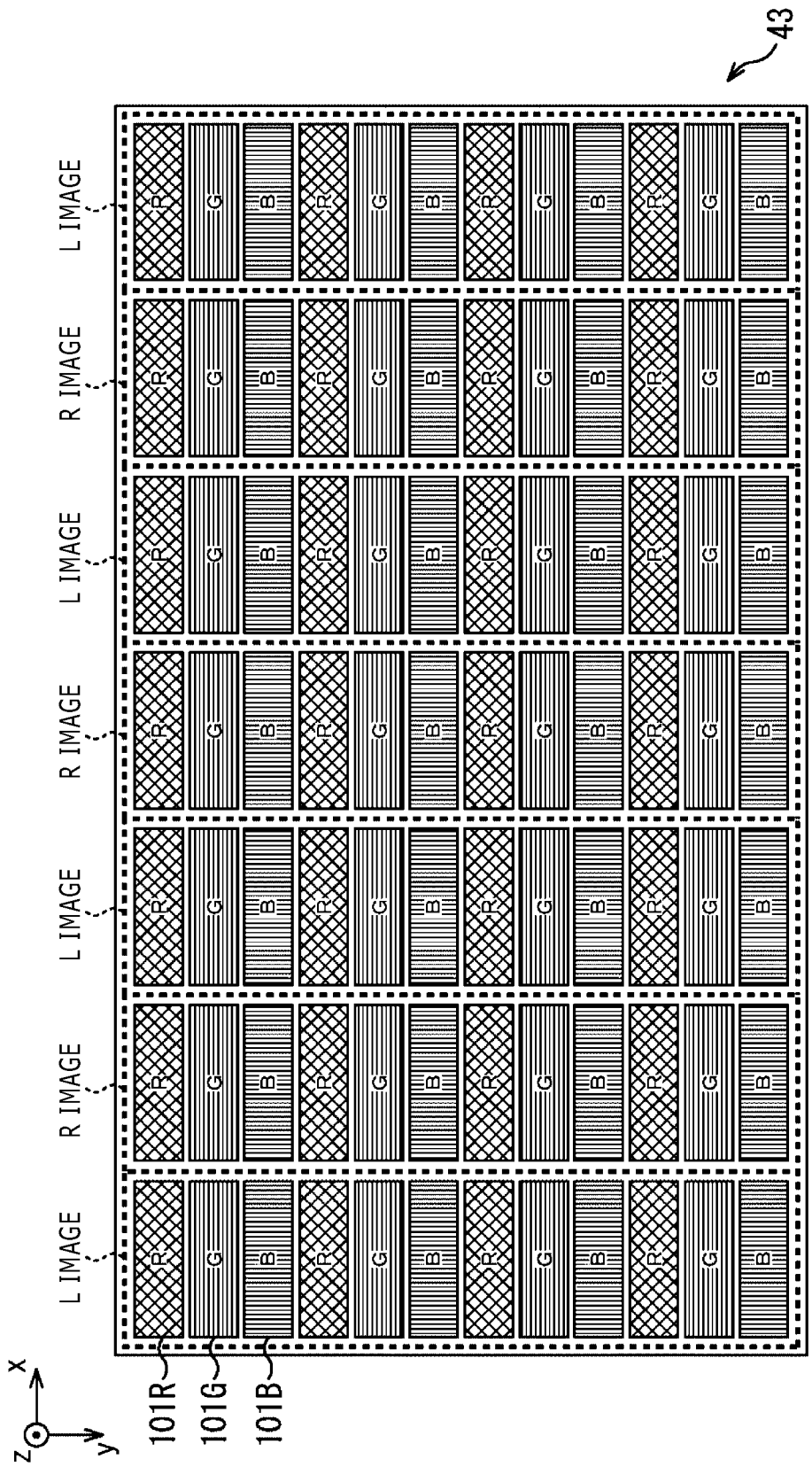
FIG. 3 is a schematic view showing color filters of the stereoscopic image display apparatus in a state in which the display mode is the landscape display mode.

Accordingly, upon display of a stereoscopic image, when the display mode is the landscape mode, a rectangular region for a left-eye image, namely, an L image, which configures a stereoscopic image and a rectangular region for a right-eye image, namely, an R image, which configures the stereoscopic image are displayed alternately and successively in a juxtaposed relationship with each other in the x direction as seen in FIG. 3.

In FIG. 3, color filters corresponding to the pixels are shown. The color filters of FIG. 3 include color filters 101R which transmit only light of a red color (R) therethrough, color filters 101G which transmit only light of a green color (G) therethrough and color filters 101B which transmit only light of a blue color (B) therethrough.

In particular, in the present embodiment, one pixel is configured from three sub pixels corresponding to the color filters 101R, 101G and 101B of the three colors. The sub pixels are arrayed in a striped array, and when the display mode is the landscape mode, the rectangular pixel region upon image display extends in a state elongated horizontally in the x direction.

Figure 4:
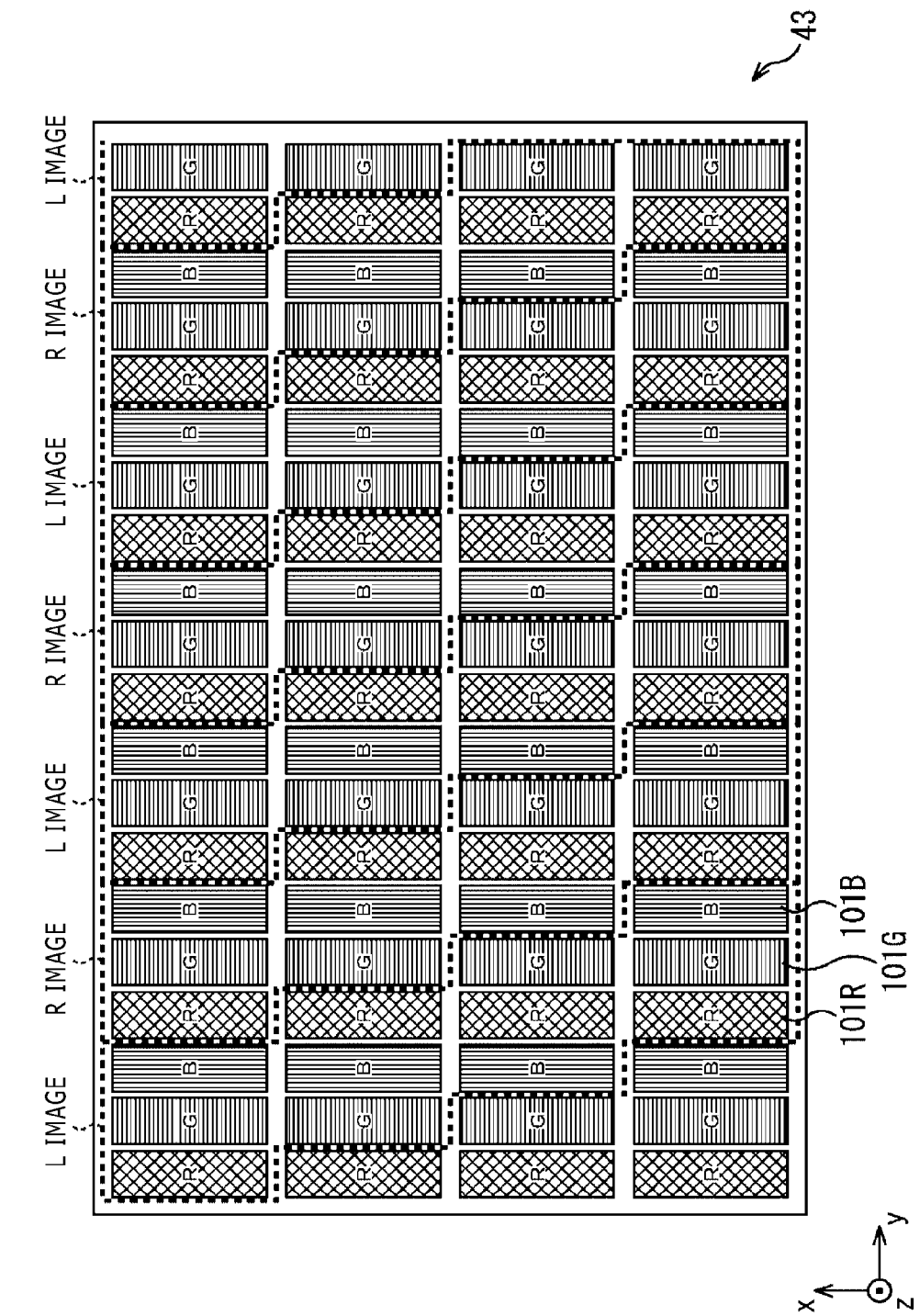
FIG. 4 is a similar view but showing the color filters in another state in which the display mode is the portrait display mode.

On the other hand, when the display mode is the portrait mode, a rectangular region for a left-eye image, namely, an L image, which configures a stereoscopic image and a rectangular region for a right-eye image, namely, an R image, which configure the stereoscopic image, are alternately displayed in a juxtaposed relationship with each other in the y direction as seen in FIG. 4. In the present embodiment, when the display mode is the portrait mode, the rectangular pixel region upon image display extends in a state elongated vertically in the y direction. Further, one pixel in each of the L image and the R image is disposed such that it is displaced or shifted rightwardly by one sub pixel distance in the downward direction in FIG. 4.

It is to be noted that, in the light modulating panel 43, light transmitted through one pixel, namely, through one transmission region 91, serves as light for displaying one pixel on the image.

While a left-eye image and a right-eye image which configure a stereoscopic image have a parallax therebetween, in the landscape display mode, the x direction in FIG. 2 is a direction of the parallax between a left-eye image and a right-eye image, namely, the parallax direction, in other words, a direction in which the left and right eyes of the viewer are juxtaposed. Thus, the parallax direction and the direction of a line of the color filters, namely, the longitudinal direction of the rectangular pixel regions, are parallel to each other. Meanwhile, in the portrait display mode, the y direction in FIG. 2 is a parallax direction between a left-eye image and a right-eye image, and the parallax direction and the direction of a line of the color filters are perpendicular to each other.

On the other hand, upon display of a two-dimensional planar image, each of the transmission regions 91 transmits light for displaying a planar image, which has entered through the parallax barrier 42 in a white state over an overall area thereof from the backlight 41, so as to enter the eyes of the viewer.

[Electrodes for the Formation of a Parallax Barrier]

Here, the electrodes formed on a face of the transparent substrates 62 and 63 on the switching liquid crystal layer 64 side in the parallax barrier 42 are described with reference to FIG. 5.

Figure 5:
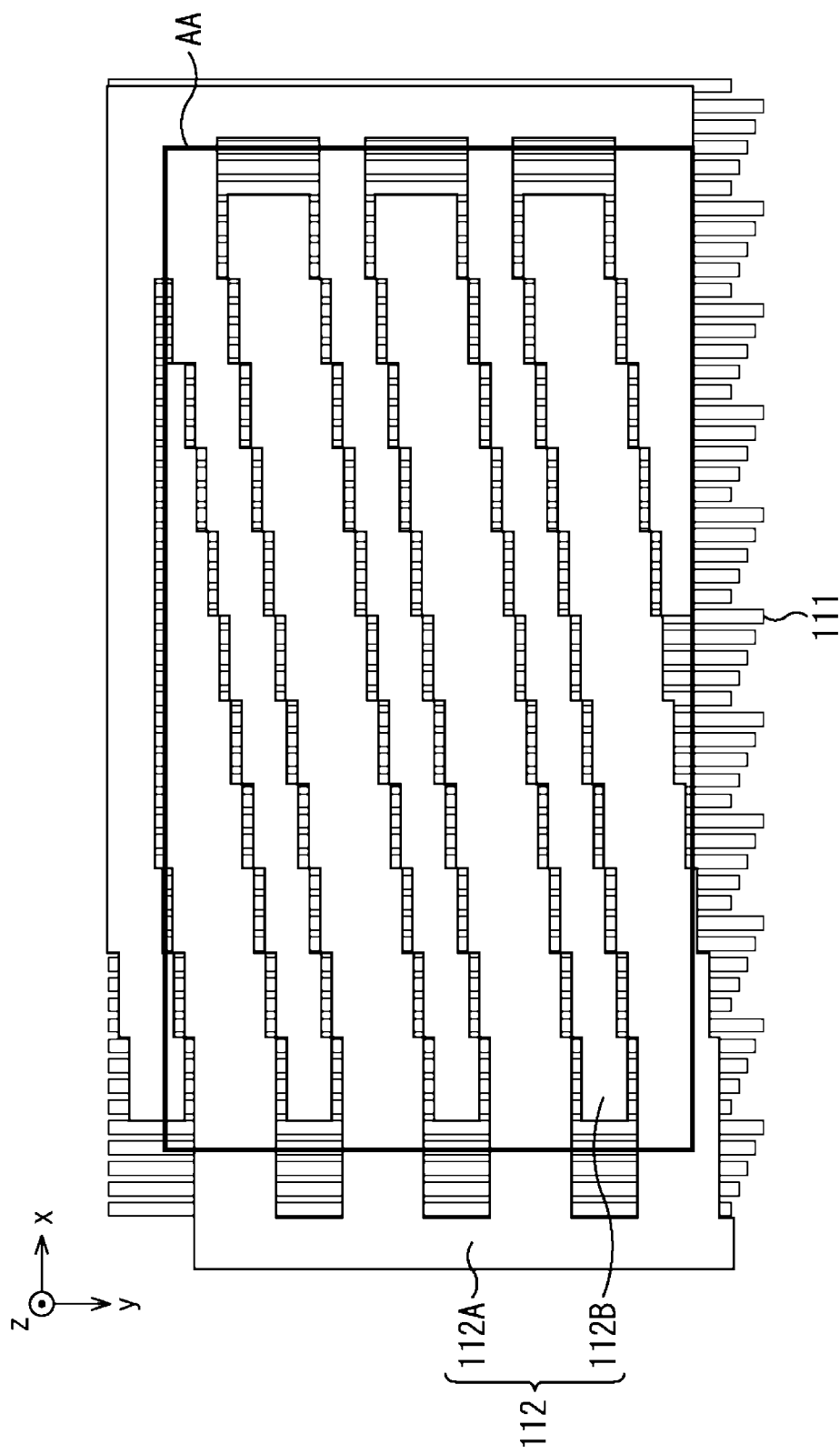
FIG. 5 is a schematic view showing electrodes of the stereoscopic image display apparatus by which a parallax barrier is formed.

As seen in FIG. 5, two electrodes 111 and 112 are formed on the face of the transparent substrates 62 and 63 on the switching liquid crystal layer 64 side. It is to be noted that a region AA corresponds to an active area of the display region of the display section 21.

To the electrode 111, a voltage is applied when the display mode of the display section 21 is the landscape mode. Consequently, a striped parallax barrier including light blocking regions and slit regions is formed in the switching liquid crystal layer 64.

The electrode 112 includes an electrode 112A and another electrode 112B. When the display mode of the display section 21 is the portrait mode, a voltage is applied to the electrodes 112A and 112B. Consequently, such a stepwise parallax barrier including light blocking regions and slip regions as seen in FIG. 6 is formed in the switching liquid crystal layer 64.

Figure 6:
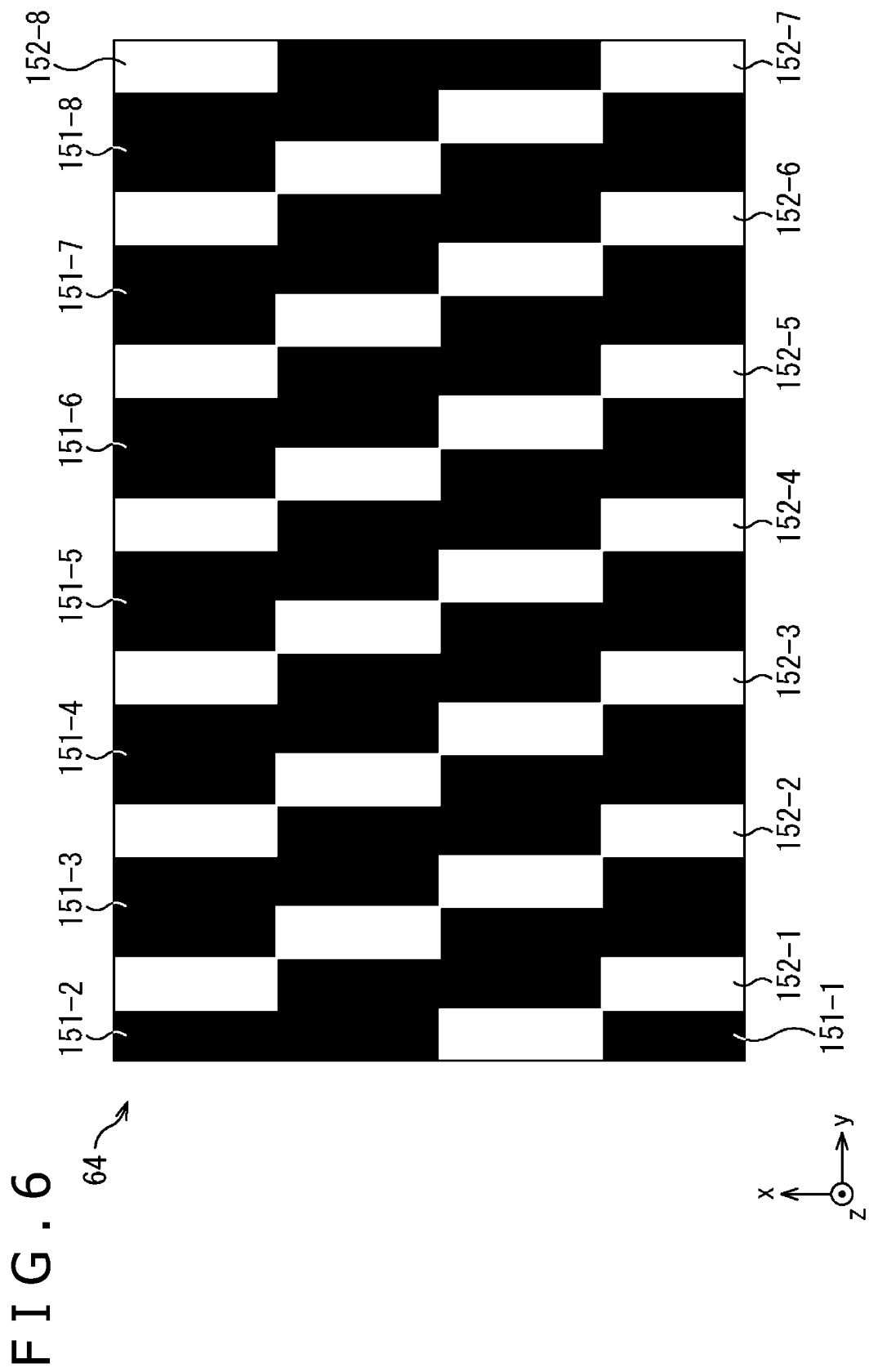
FIG. 6 is a schematic view showing a stepwise parallax barrier.

In particular, if a voltage of 5 V or −5 V is applied to the electrode 112A and another voltage of 0 V is applied to the electrode 112B and the electrode 111, then such a parallax barrier as seen in FIG. 6 is formed on the switching liquid crystal layer 64. The parallax barrier includes light blocking regions 151-1 to 151-8 which block light incoming from the backlight 41 and slit regions 152-1 to 152-8 which transmit light incoming from the backlight 41 therethrough.

It is to be noted that, where there is no necessity to individually distinguish the light blocking regions 151-1 to 151-8 from each other, each of them is hereinafter referred to merely as light blocking region 151. Further, where there is no necessity to individually distinguish the slit regions 152-1 to 152-8 from each other, each of them is hereinafter referred to merely as slit region 152.

Each slit region 152 shown in FIG. 6 is formed from rectangular regions elongated in the x direction and juxtaposed in a rightwardly downward direction in FIG. 6. The parallax barrier is a stepwise barrier in which the light blocking regions 151 and the slit regions 152 are juxtaposed alternately in the y direction.

Figure 7:
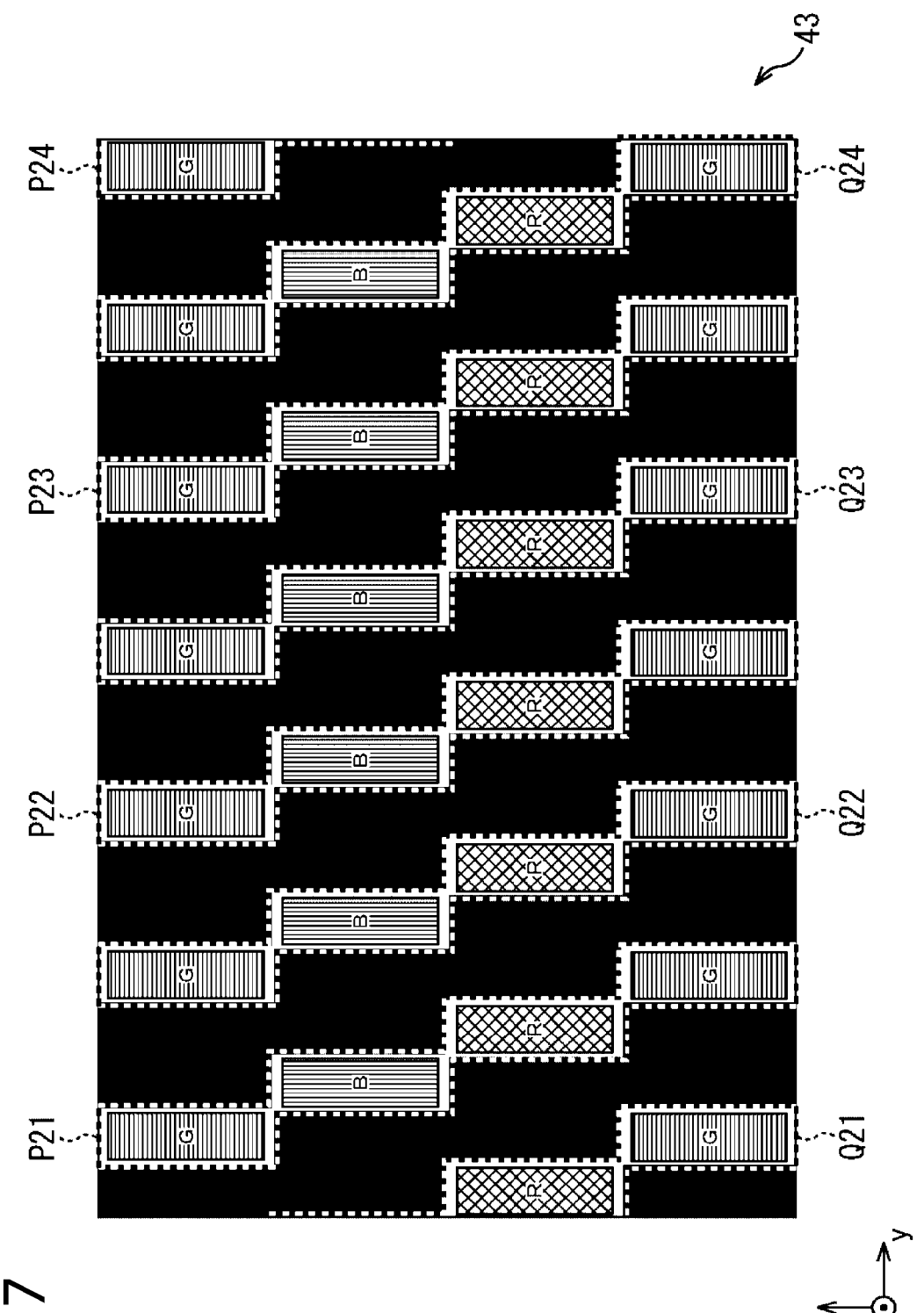
FIG. 7 is a schematic view showing a visible region when the stepwise parallax barrier is formed.

In the case where such a parallax barrier as just described is formed, if a viewer watches the liquid crystal display device 11 from a predetermined viewpoint position, then regions Q21 to Q24 on the light modulating panel 43 are viewing regions of the right eye of the viewer while regions P21 to P24 are viewing regions of the left eye of the viewer as seen in FIG. 7. Consequently, a stereoscopic image formed from images of different viewpoints is perceived by the viewer.

<2. Stereoscopic Image Displaying Process of the Liquid crystal display device>

Figure 8:
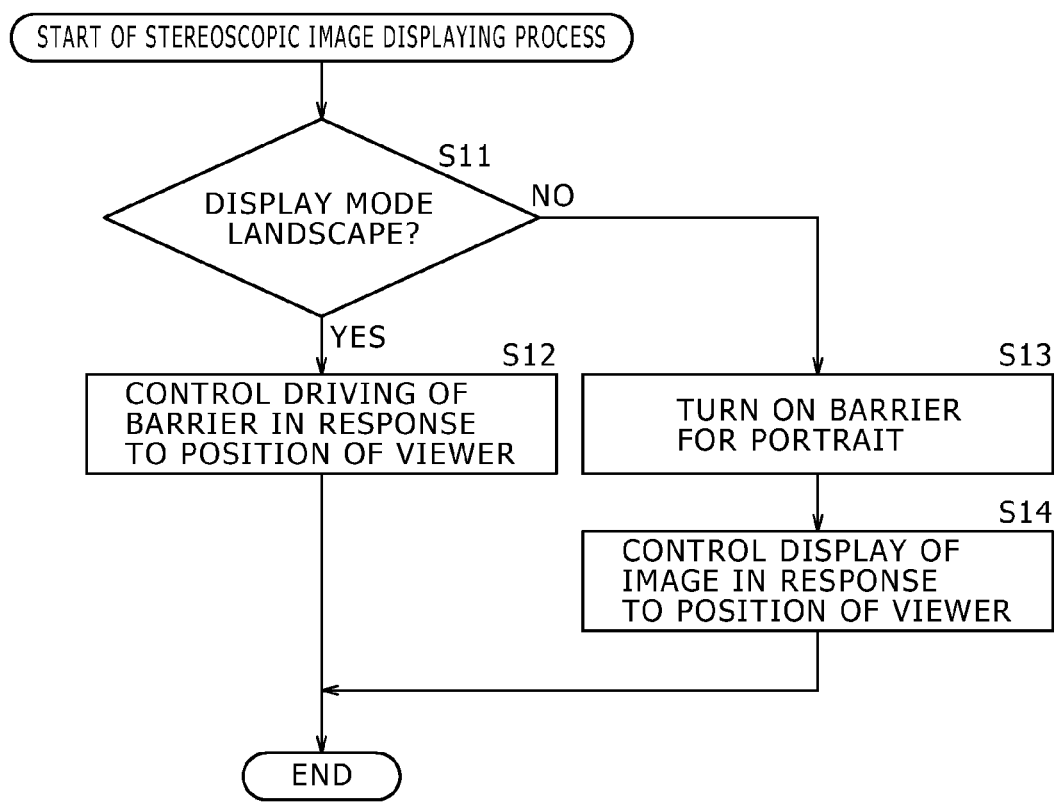
FIG. 8 is a flow chart illustrating a stereoscopic image displaying process of the stereoscopic image display apparatus.

Now, a stereoscopic image displaying process of the liquid crystal display device 11 is described with reference to FIG. 8.

At step S11, the display mode decision unit 31 of the control section 22 decides whether or not the display mode of the light modulating panel 43 is the landscape mode.

If it is decided at step S11 that the display mode is the landscape mode, then the processing advances to step S12.

At step S12, the barrier driving controlling unit 32 controls driving of the parallax barrier 42 in response to the position of the viewer AUD detected by the camera 23 to move the position of the light blocking region 72 of the switching liquid crystal layer 64. It is to be noted that, at this time, the barrier driving controlling unit 32 forms a striped parallax barrier in the parallax barrier 42.

Figure 9:
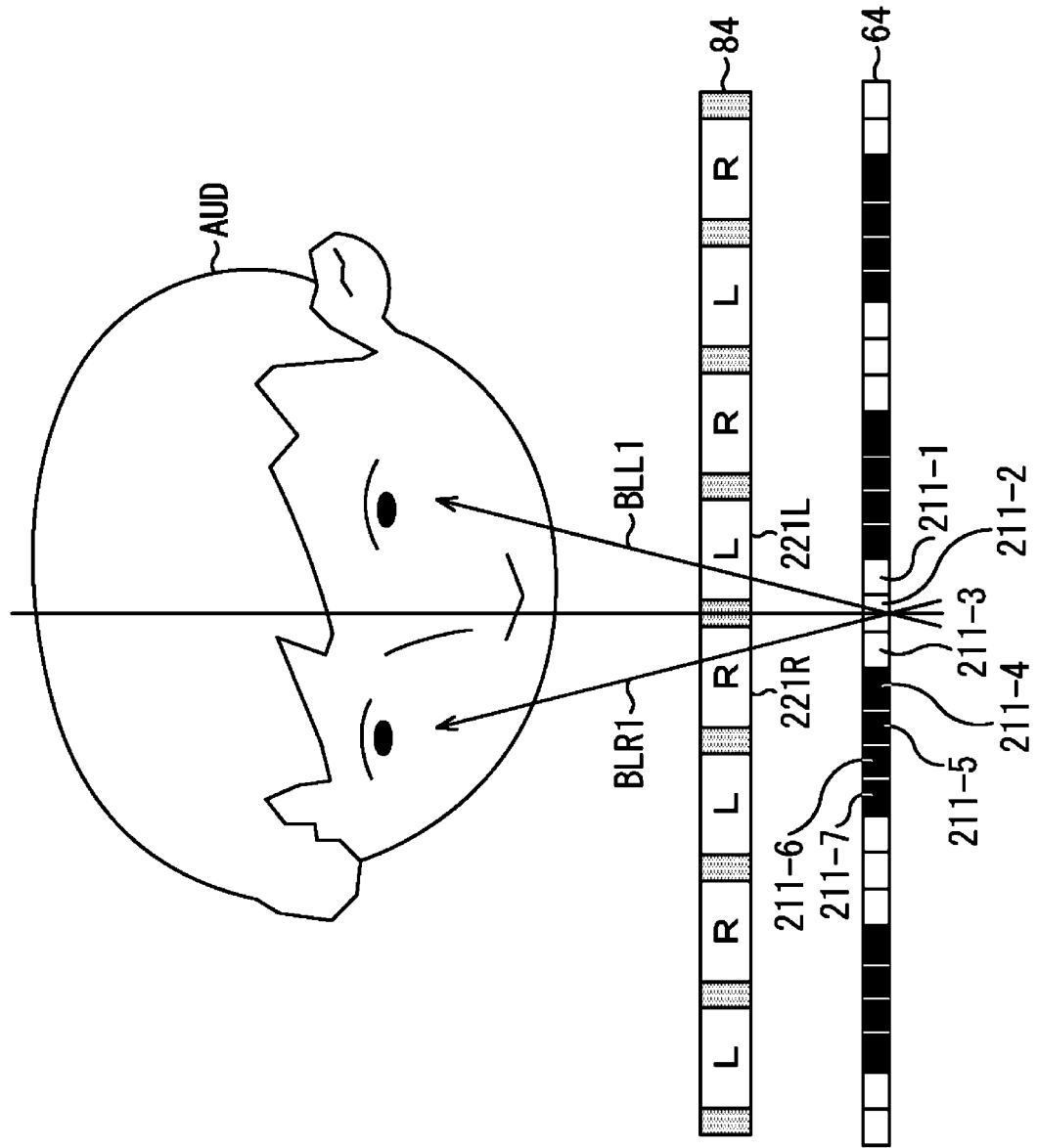
FIGS. 9 and 10 are schematic views illustrating a shifting movement of the parallax barrier.

FIG. 9 illustrates a position of the head of the viewer AUD and a state of the switching liquid crystal layer 64 and the liquid crystal layer 84 at a predetermined point of time.

Referring to FIG. 9, each of rectangular spaces shown in the switching liquid crystal layer 64 represents a region formed from an electrode 111, and particularly, a blank rectangular space represents a slit region while a solid region represents a light blocking region. In FIG. 9, regions 211-1 to 211-3 are slit regions while regions 211-4 to 211-7 are light blocking regions.

Meanwhile, each of rectangular spaces shown in the liquid crystal layer 84 represents a region corresponding to a pixel. In particular, a rectangular space in which the character "R" is placed is a transmission region in which light for displaying a right-eye image is transmitted while a rectangular space in which the character "L" is placed is a transmission region in which light for displaying a left-eye image is transmitted. In FIG. 9, a light flux BLR1 from the backlight 41 not shown in FIG. 9 is transmitted through the region 211-2 and the transmission region 221R and enters the right eye of the viewer AUD. Meanwhile, another light flux BLL1 from the backlight 41 not shown in FIG. 9 is transmitted through the region 211-2 and the transmission region 221L and enters the left eye of the viewer AUD.

Figure 10:
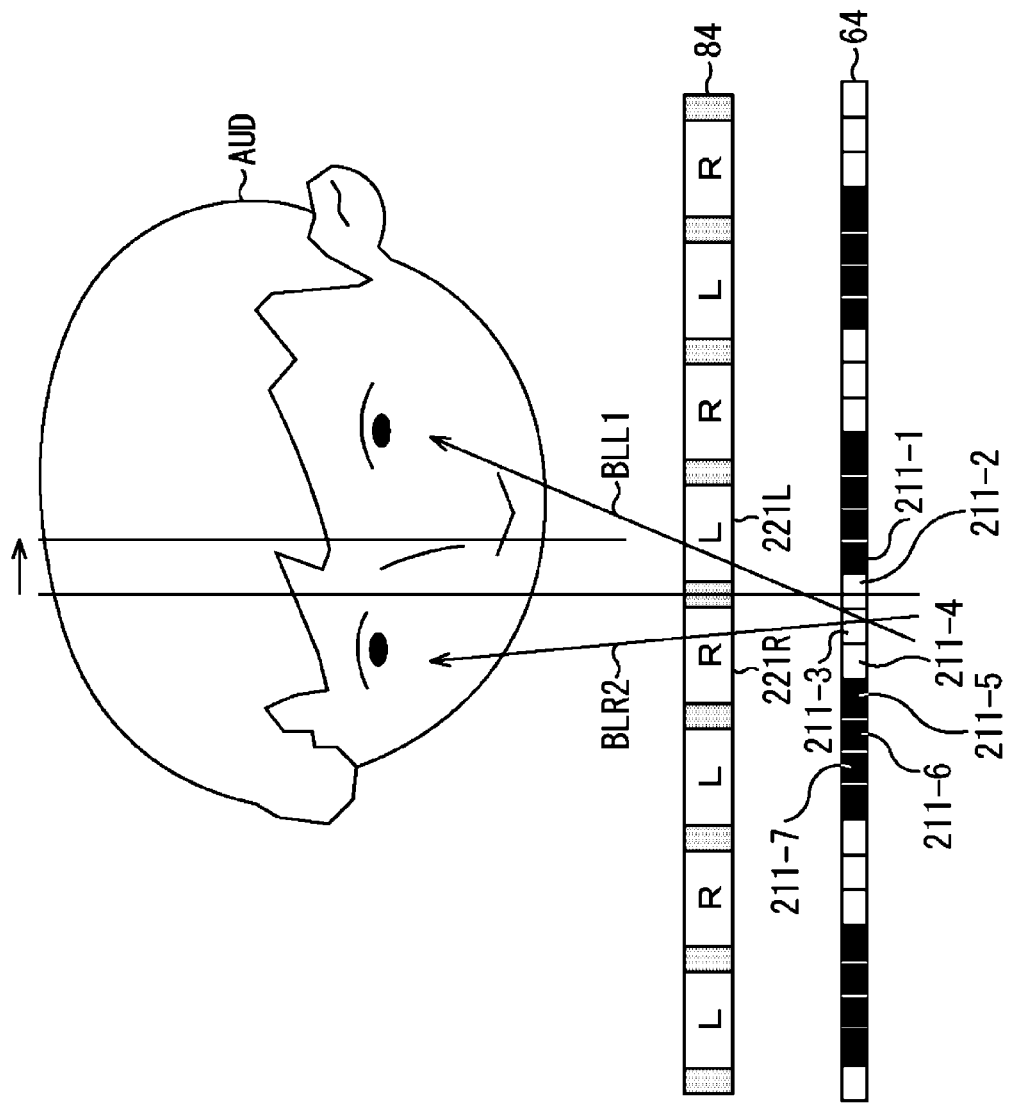

If the viewer AUD moves rightwardly in FIG. 9 from the position shown in FIG. 9, then the regions 211-2 to 211-4 become slit regions and the regions 211-1 and 211-5 to 211-7 become light blocking regions as shown in FIG. 10. In other words, the position of the light blocking regions and the slit regions moves or shifts in response to the position of the head of the viewer AUD. Consequently, a light flux BLR2 from the backlight 41 not shown in FIG. 10 is transmitted through the region 211-3 and the transmission region 221R and enters the right eye of the viewer AUD while another light flux BLL2 from the backlight 41 not shown in FIG. 10 is transmitted through the region 211-3 and the transmission region 221L and enters the left eye of the viewer AUD.

In this manner, even if the viewer AUD moves, the viewer AUD can continue to observe or view an image corresponding to the transmission regions 221R and 221L. Consequently, an uncomfortable feeling when a left-eye image and a right-eye image are switched can be eliminated.

Referring back to FIG. 8, if it is decided at step S11 that the display mode is not the landscape mode, or in other words, if the display mode is the portrait mode, then the processing advances to step S13.

At step S13, the barrier driving controlling unit 32 controls driving of the switching liquid crystal layer 64 to apply a voltage of 5 V or −5 V to the electrode 112A and apply another voltage of 0 V to the electrode 112B and the electrode 111 to turn on a barrier for the portrait mode. In other words, the barrier driving controlling unit 32 controls the parallax barrier 42 to form a stepped parallax barrier.

Then at step S14, the display controlling unit 33 controls the display of the light modulating panel 43 so that the position of the left-eye image and the right-eye image to be displayed on the light modulating panel 43 is moved in response to the position of the head of the viewer AUD detected by the camera 23.

Figure 11:
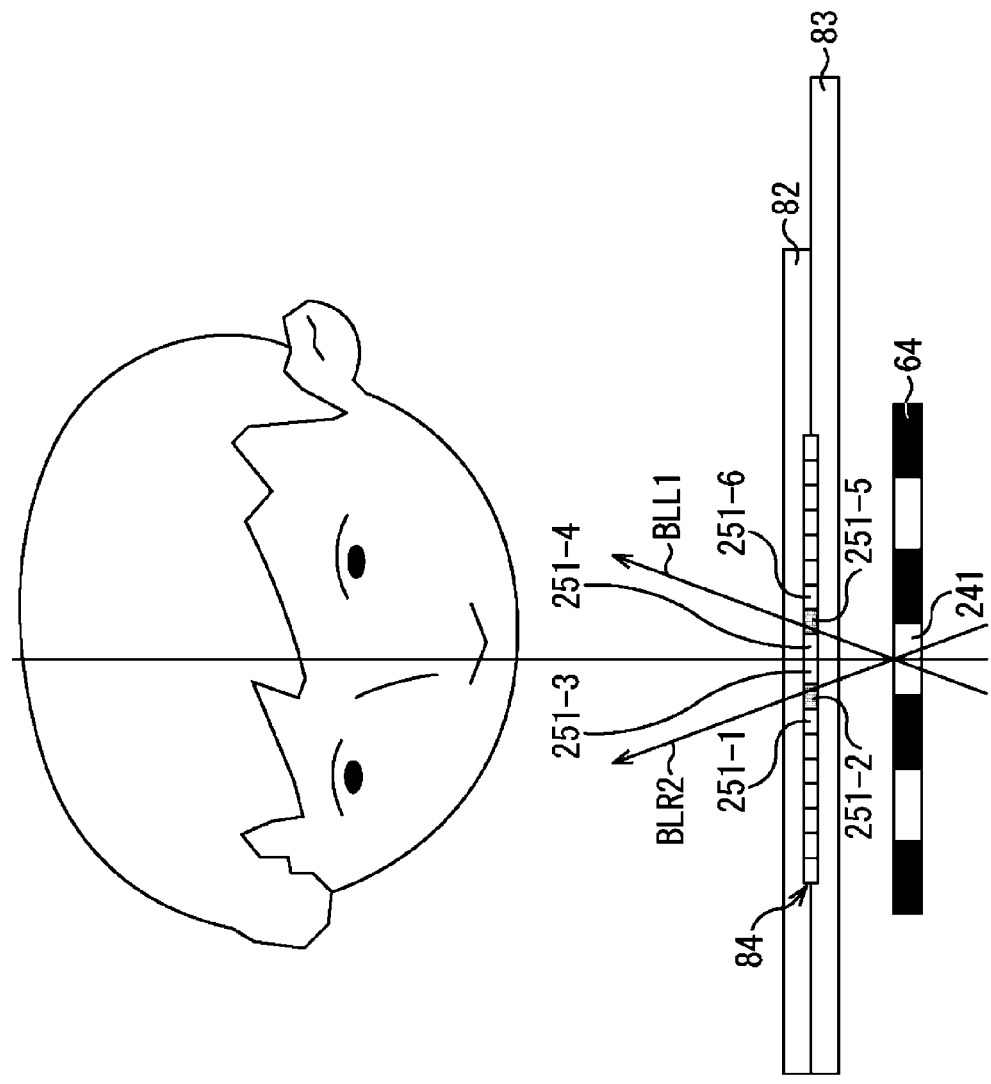
FIGS. 11 and 12 are schematic views illustrating a shifting movement of a display image.

FIG. 11 illustrates the position of the head of the viewer AUD and a state of the switching liquid crystal layer 64 and the liquid crystal layer 84 at a predetermined point of time.

Referring to FIG. 11, each of rectangular spaces shown in the switching liquid crystal layer 64 represents a region formed from an electrode 112, and particularly, a blank rectangular space represents a slit region while a solid region represents a light blocking region. In FIG. 11, a region 241 is a slit region.

Meanwhile, each of rectangular spaces shown in the liquid crystal layer 84 represents a region corresponding to a pixel. In particular, a solid region represents a transmission region which transmits therethrough light for displaying a predetermined right-eye image or left-eye image while a blank region represents a region which transmits therethrough light for displaying a different image. In particular, from among transmission regions 251-1 to 251-6, the transmission regions 251-1 to 251-3 correspond to pixels of a right-eye image while the transmission regions 251-4 to 251-6 correspond to pixels of a left-eye image. In FIG. 11, a light flux BLR2 from the backlight 41 not shown in FIG. 11 is transmitted through the region 241 and the transmission region 251-2 and enters the right eye of the viewer AUD so that a right-eye image centered at the region 251-2 is viewed by the viewer. Meanwhile, another light flux BLL1 from the backlight 41 not shown in FIG. 11 is transmitted through the region 241 and the transmission region 251-5 and enters the left eye of the viewer AUD so that a left-eye image centered at the transmission region 251-6 is viewed by the viewer.

Figure 12:
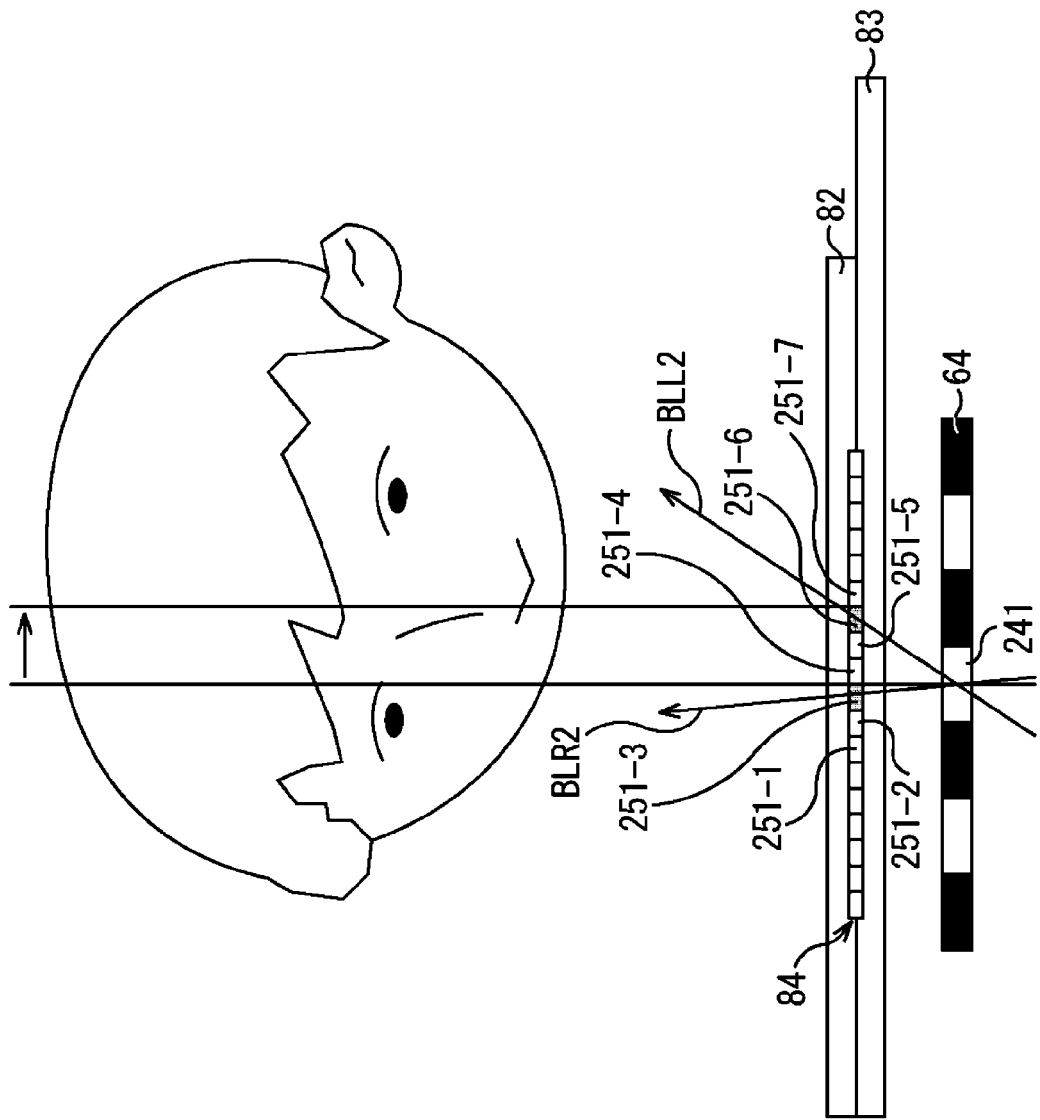

If the viewer AUD moves rightwardly in FIG. 11 from the position shown in FIG. 11, then the transmission regions 251-2 to 251-4 come to correspond to pixels of a right-eye image and the transmission regions 251-5 to 251-7 come to correspond to pixels of a left-eye image. In other words, the position of the left-eye image and the right-eye image moves or shifts in response to the position of the head of the viewer AUD. Consequently, a light flux BLR2 from the backlight 41 not shown in FIG. ?12 is transmitted through the region 241 and the transmission region 251-3 and enters the right eye of the viewer AUD so that a right-eye image centered at the transmission region 251-3 comes to be viewed by the viewer. Meanwhile, another light flux BLL2 from the backlight 41 not shown in FIG. 12 is transmitted through the region 241 and the transmission region 251-6 and enters the left eye of the viewer AUD so that a left-eye image centered at the transmission region 251-6 comes to be viewed by the viewer.

In this manner, even if the viewer AUD moves, the viewer AUD can continue to observe or view a left-eye image and a right-eye image. Consequently, an uncomfortable feeling when a left-eye image and a right-eye image are switched can be eliminated. Further, with the stepwise parallax barrier, the degree of freedom of the opening width of the slit regions can be raised.

It is to be noted that the processes described above are repeated at each predetermined timing.

According to the processes described above, when the display mode is the landscape mode, driving of the parallax barrier is controlled so that the position of the light blocking regions is moved in response to the position of the viewer. However, when the display mode is the portrait mode, display of the optical modulation panel is controlled so that the display position of the left-eye image and the right-eye image is moved in response to the position of the viewer. Consequently, whichever one of the landscape mode and the portrait mode the display mode at present is, a stereoscopic image suitable for the display state can be presented to the viewer. In other words, optimization of the display of a stereoscopic image can be achieved in response to the position of the viewer irrespective of the display mode.

<3. Application Examples to an Electronic Apparatus>

Now, referring to FIGS. 13 to 17, application examples of the liquid crystal display device described hereinabove in connection with the embodiment of the present technology are described. The liquid crystal display device of the embodiment described above can be applied to electronic apparatus in all fields such as a television apparatus, a digital camera, a notebook type personal computer, a portable terminal apparatus such as a portable telephone set or a video camera. In other words, the liquid crystal display device of the embodiment can be applied to electronic apparatus in all fields wherein a video signal inputted from the outside or a video signal generated internally is displayed as an image.

APPLICATION EXAMPLE 1

Figure 13:
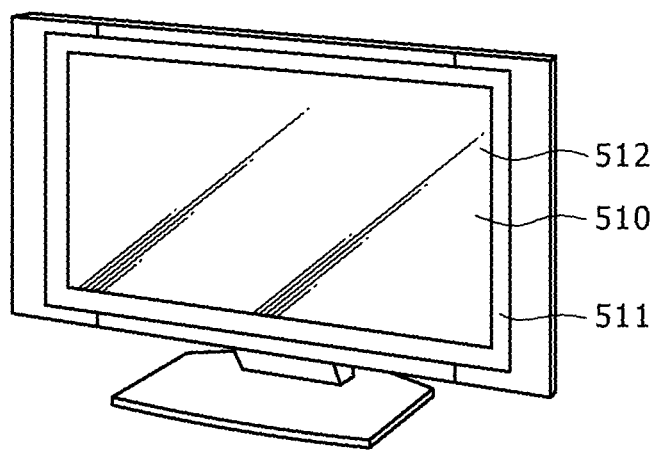

FIG. 13 shows an appearance of a television apparatus to which the liquid crystal display device of the embodiment described hereinabove is applied. Referring to FIG. 13, the television apparatus shown includes, for example, a video displaying screen section 510 which in turn includes a front panel 511 and a filter glass plate 512. The video displaying screen section 510 is configured from the liquid crystal display device according to the embodiment described hereinabove.

APPLICATION EXAMPLE 2

Figure 14A:
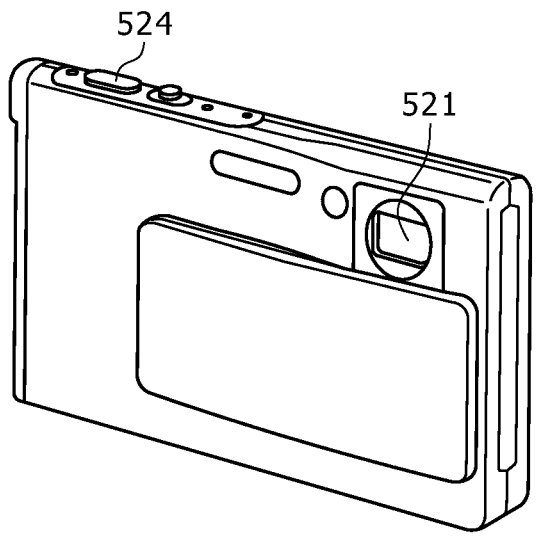
Figure 14B:
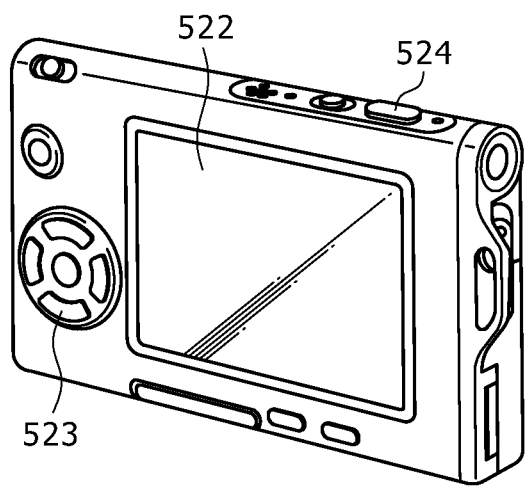

FIGS. 14A and 14B show an appearance of a digital camera to which the liquid crystal display device of the embodiment described hereinabove is applied. Referring to FIGS. 14A and 14B, the digital camera shown includes, for example, a light emitting section 521 for flashlight, a display section 522, a menu switch 523 and a shutter button 524. The display section 522 is configured from the liquid crystal display device according to the embodiment described hereinabove.

APPLICATION EXAMPLE 3

Figure 15:
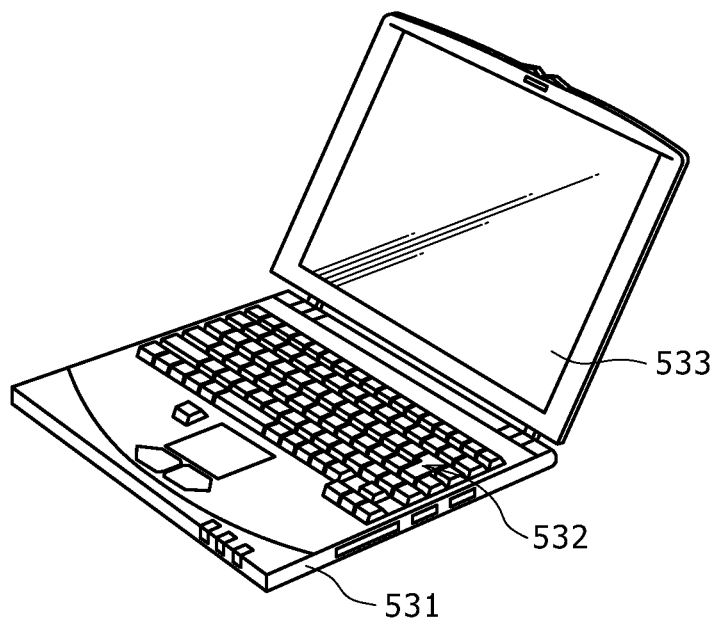

FIG. 15 shows an appearance of a notebook type personal computer to which the liquid crystal display device of the embodiment described hereinabove is applied. Referring to FIG. 15, the notebook type personal computer shown includes, for example, a main body 531, a keyboard 532 for being operated to input characters and so forth, and a display section 533 for displaying an image. The display section 533 is configured from the liquid crystal display device according to the embodiment described hereinabove.

APPLICATION EXAMPLE 4

Figure 16:
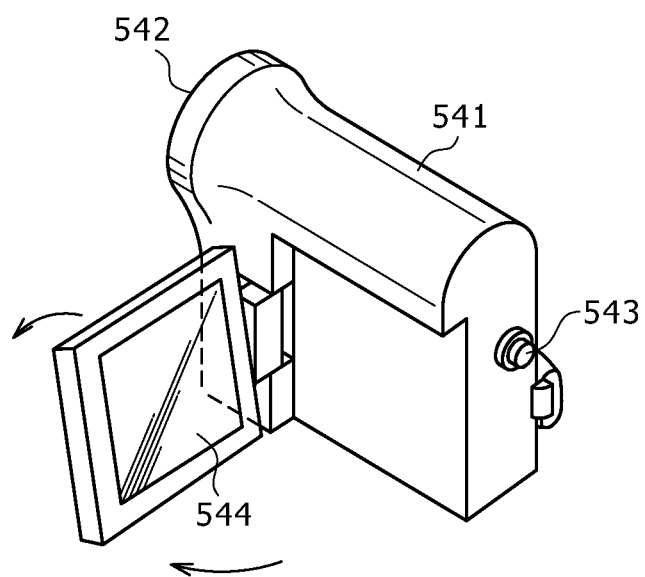

FIG. 16 shows an appearance of a video camera to which the liquid crystal display device of the embodiment described hereinabove is applied. Referring to FIG. 16, the video camera shown includes, for example, a main body section 541, a lens 542 provided on a front face of the main body section 541 for picking up an image of an image pickup object, a start/stop switch 543 for image pickup, and a display section 544. The display section 544 is configured from the liquid crystal display device according to the embodiment described hereinabove.

APPLICATION EXAMPLE 5

FIGS. 17A to 17G show an appearance of a portable telephone set to which the liquid crystal display device of the embodiment described hereinabove is applied. Referring to FIGS. 17A to 17G, the portable telephone set shown includes, for example, an upper side housing 710 and a lower side housing 720 connected to each other by a connection section 730 in the form of a hinge. The portable telephone set further includes a display section 740, a sub display section 750, a picture light 760, and a camera 770. The display section 740 or the sub display section 750 is configured from the liquid crystal display device according to the embodiment described hereinabove.

It is to be noted that, while the stereoscopic image display apparatus of the embodiment described hereinabove displays images of two viewpoints to provide a stereoscopic image to the viewer, it may be configured otherwise such that it provides not only a stereoscopic image but also a plurality of images which depend upon viewpoints, in other words, multi-viewpoint images. More particularly, the present technology may be applied, for example, to a car navigation system by which different images are viewed from a driver's seat and a passenger's seat of a vehicle.

Further, the embodiment of the present technology is not limited to the specific embodiment described hereinabove but can be modified or altered in various manners without departing from the subject matter of the present technology.

The present technology can take the following configurations.

(1) A liquid crystal display device including a liquid crystal panel which displays a left-eye image and a right-eye image, a light blocking barrier having a light blocking section which creates a binocular parallax, and a sensor which detects a position of a viewer, having:

a barrier driving controlling unit configured to control driving of the light blocking barrier;

a display controlling unit adapted to control display of the liquid crystal panel; and a display mode decision unit configured to decide a display mode of an image to be displayed on the liquid crystal panel; wherein the barrier driving controlling unit controls, when the display mode decision unit decides that the display mode of the image is a first mode, driving of the light blocking barrier so that the position of the light blocking section of the light blocking barrier is moved in response to the position of the viewer detected by the sensor; and the display controlling unit controls, when the display mode decision unit decides that the display mode of the image is a second mode, the display of the liquid crystal panel so that the display position of the left-eye image and the right-eye image on the liquid crystal panel is moved in response to the position of the viewer detected by the sensor.

(2) The liquid crystal display device according to (1) above, wherein the barrier driving controlling unit controls, when the display mode decision unit decides that the display mode of the image is the first mode, the light blocking barrier to form the light blocking section in a striped pattern, and when the display mode decision unit decides that the display mode of the image is the second mode, the light blocking barrier to form the light blocking section in a stepped pattern.

(3) The liquid crystal display device according to (1) or (2) above, wherein the first mode is a mode in which a parallax direction and a line of a color filter in the liquid crystal panel extend in parallel to each other, and the second mode is a different mode in which the parallax direction and the line of the color filter in the liquid crystal panel extend perpendicular to each other.

(4) The liquid crystal display device according to any one of (1) to (3) above, further including a backlight configured to introduce light for display of the image into the liquid crystal panel, wherein the light blocking barrier is disposed between the liquid crystal panel and the backlight.

(5) A driving method for a liquid crystal display device including a liquid crystal panel which displays a left-eye image and a right-eye image, a light blocking barrier having a light blocking section which creates a binocular parallax, and a sensor which detects a position of a viewer, the liquid crystal display device further including a barrier driving controlling unit configured to control driving of the light blocking barrier, a display controlling unit adapted to control display of the liquid crystal panel, and a display mode decision unit configured to decide a display mode of an image to be displayed on the liquid crystal panel, the driving method being executed by the liquid crystal display device including:

deciding the display mode of the image to be displayed on the liquid crystal panel; and controlling, when it is decided that the display mode of the image is a first mode, driving of the light blocking barrier so that the position of the light blocking section of the light blocking barrier is moved in response to the position of the viewer detected by the sensor; and controlling, when it is decided that the display mode of the image is a second mode, the display of the liquid crystal panel so that the display position of the left-eye image and the right-eye image on the liquid crystal panel is moved in response to the position of the viewer detected by the sensor.

(6) An electronic apparatus, including:

a liquid crystal display device configured to carry out display based on an image signal; and a processing section configured to produce the image signal by a predetermined process;

the liquid crystal display device including a liquid crystal panel which displays a left-eye image and a right-eye image, a light blocking barrier having a light blocking section which creates a binocular parallax, and a sensor which detects a position of a viewer;

the liquid crystal display device further having a barrier driving controlling unit configured to control driving of the light blocking barrier, a display controlling unit adapted to control display of the liquid crystal panel, and a display mode decision unit configured to decide a display mode of an image to be displayed on the liquid crystal panel, wherein the barrier driving controlling unit controls, when the display mode decision unit decides that the display mode of the image is a first mode, driving of the light blocking barrier so that the position of the light blocking section of the light blocking barrier is moved in response to the position of the viewer detected by the sensor, and the display controlling unit controls, when the display mode decision unit decides that the display mode of the image is a second mode, the display of the liquid crystal panel so that the display position of the left-eye image and the right-eye image on the liquid crystal panel is moved in response to the position of the viewer detected by the sensor.

The present disclosure contains subject matter related to that disclosed in Japanese Priority Patent Application JP 2011-271942 filed in the Japan Patent Office on Dec. 13, 2011, the entire content of which is hereby incorporated by reference.

What is claimed is:

1. A liquid crystal display device including a liquid crystal panel which displays a left-eye image and a right-eye image, a light blocking barrier having a light blocking section which creates a binocular parallax, and a sensor which detects a position of a viewer, comprising:

a barrier driving controlling unit configured to control driving of the light blocking barrier;

a display controlling unit adapted to control display of the liquid crystal panel; and a display mode decision unit configured to decide a display mode of an image to be displayed on the liquid crystal panel; wherein the liquid crystal panel includes a. plurality of pixels arranged in a first direction and a second direction in matrix form, each the plurality of pixels includes a plurality of sub pixels arranged in the second direction, respective ones of the sub pixels in each of the plurality of pixels correspond to color filters of different colors from one another, color filters of the same color are arranged in the first direction in a line form, when the display mode of the image is a first mode in which the first direction is a parallax direction, the display controlling unit is configured to control the display of the liquid crystal panel so that a left-eye image and a right eye image, both extending in a stripe shape in the second direction, are displayed alternately in the first direction, and the barrier driving controlling unit is configured to control driving of the light blocking barrier so that the light blocking barrier forms a light blocking section in a striped pattern and the position of the light blocking section of the light blocking barrier is moved in response to the position of the viewer detected by the sensor, and when the display mode of the image is a second mode in which the second direction is the parallax direction, the display controlling unit is configured to control the display of the liquid crystal panel so that the left-eye image and the right-eye image, both extending in a direction oblique to the first direction, are displayed alternately in the second direction, and the display position of the left-eye image and the right-eye image on the liquid crystal panel is moved in response to the position of the viewer detected by the sensor, and the barrier driving controlling unit is configured to control driving of the light blocking barrier so that the light blocking barrier forms the light blocking section in a stepped pattern.

2. The liquid crystal display device according to claim 1, further comprising:

a backlight configured to introduce light for display of the image into the liquid crystal panel, wherein the light blocking barrier is disposed between the liquid crystal panel and the backlight.

3. A driving method for a liquid crystal display device including a liquid crystal panel which displays a left-eye image and a right-eye image, a light blocking barrier having a light blocking section which creates a binocular parallax, and a sensor which detects a position of a viewer, the liquid crystal display device further including a barrier driving controlling unit configured to control driving of the light blocking barrier, a display controlling unit adapted to control display of the liquid crystal panel, and a display mode decision unit configured to decide a display mode of an image to be displayed on the liquid crystal panel, wherein the liquid crystal panel includes a plurality of pixels arranged in a first direction and a second direction in matrix form, each of the plurality of pixels includes a plurality of sub pixels arranged in the second direction, respective ones of the sub pixels in each of the plurality of pixels correspond to color filters of different colors from one another, color filters of the same color are arranged in the first direction in a line form, the driving method being executed by the liquid crystal display device comprising:

deciding the display mode of the image to be displayed on the liquid crystal panel; and when the display mode of the image is a first mode in which the first direction is a parallax direction, controlling the display of the liquid crystal panel so that a left-eye image and a right-eye image, both extending in a stripe shape in the second direction, are displayed alternately in the first direction, and controlling driving of the light blocking barrier so that the light blocking barrier forms a light blocking section in a striped pattern and the position of the light blocking section of the light blocking barrier is moved in response to the position of the viewer detected by the sensor; and when the display mode of the image is a second mode in which the second direction is the parallax direction, the display controlling unit is configured to control the display of the liquid crystal panel so that the eye image and the right-eye image, both extending in a direction oblique to the first direction, are displayed alternately in the second direction, and the display position of the left-eye image and the right-eye image on the liquid crystal panel is moved in response to the position of the viewer detected by the sensor, and the barrier driving controlling unit is configured to control driving of the light blocking barrier so that the light blocking barrier forms the light blocking section in a stepped pattern.

4. An electronic apparatus, comprising:

a liquid crystal display device configured to carry out display based on an image signal; and a processing section configured to produce the image signal by a predetermined process;

the liquid crystal display device including a liquid crystal panel which displays a left-eye image and a right-eye image, a light blocking barrier having a light blocking section which creates a binocular parallax, and a sensor which detects a position of a viewer;

the liquid crystal display device further having a barrier driving controlling unit configured to control driving of the light blocking barrier, a display controlling unit adapted to control display of the liquid crystal panel, and a display mode decision unit configured to decide a display mode of an image to be displayed on the liquid crystal panel, wherein the liquid crystal panel includes a plurality of pixels arranged in a first direction and a second direction in matrix form, each of the plurality of pixels includes a plurality of :sub pixels arranged in the second direction, respective ones of the sub pixels in each of the plurality of pixels correspond to color filters of different colors from one another, color filters of the same color are arranged in the first direction in a line form, when the display mode of the image is a first mode in which the first direction is a parallax direction, the display controlling unit is configured to control the display of the liquid crystal panel so that a left-eye image and a right-eye image, both extending in a stripe shape in the second direction are first direction d the barrier driving controlling unit is configured to control driving of the light blocking barrier so that the light blocking barrier forms a light blocking section in a striped pattern and the position of the light blocking section of the light blocking barrier is moved in response to the position of the viewer detected by the sensor, and when the display mode of the image is a second mode in which the second direction is the parallax direction, the display controlling unit is configured to control the display of the liquid crystal panel so that the left-eye image and the right-eye image, both extending in a direction oblique to the first direction, are displayed alternately in the second direction, and the display position of the left-eye image and the right-eye image on the liquid crystal panel is moved in response to the position of the viewer detected by the sensor, and the barrier driving controlling unit is configured to control driving of the light blocking barrier so that the light blocking barrier forms the light blocking section in a stepped pattern.

\* \* \* \* \*

UNITED STATES PATENT AND TRADEMARK OFFICE
CERTIFICATE OF CORRECTION

| | | |
|---|---|---|
| PATENT NO. | : 9,240,146 B2 | Page 1 of 1 |
| APPLICATION NO. | : 13/687494 | |
| DATED | : January 19, 2016 | |
| INVENTOR(S) | : Tsuyoshi Ohyama et al. | |

It is certified that error appears in the above-identified patent and that said Letters Patent is hereby corrected as shown below:

ON THE TITLE PAGE,
AT (54) Title:

Please replace "THEREFORE" with --THEREFOR--

Signed and Sealed this
Twenty-fourth Day of May, 2016

Michelle K. Lee
*Director of the United States Patent and Trademark Office*